United States Patent
Bares

(10) Patent No.: US 12,426,585 B2
(45) Date of Patent: Sep. 30, 2025

(54) FISHING BAIT CARTRIDGE SPEED LOADER

(71) Applicant: Mark F Bares, West Fargo, ND (US)

(72) Inventor: Mark F Bares, West Fargo, ND (US)

( * ) Notice: Subject to any disclaimer, the term of this patent is extended or adjusted under 35 U.S.C. 154(b) by 36 days.

(21) Appl. No.: 18/458,328

(22) Filed: Aug. 30, 2023

(65) Prior Publication Data
US 2024/0065247 A1    Feb. 29, 2024

Related U.S. Application Data

(60) Provisional application No. 63/374,025, filed on Aug. 31, 2022.

(51) Int. Cl.
*A01K 97/04*    (2006.01)

(52) U.S. Cl.
CPC ............ *A01K 97/045* (2013.01); *A01K 97/04* (2013.01)

(58) Field of Classification Search
CPC ................................ A01K 97/04; A01K 97/05
See application file for complete search history.

(56) References Cited

U.S. PATENT DOCUMENTS

| | | | |
|---|---|---|---|
| 2,076,157 A | 4/1937 | Perkins | |
| 2,763,956 A | 9/1956 | Olson | |
| 2,883,788 A * | 4/1959 | Stitt | A01K 97/04 43/55 |
| 3,006,106 A | 10/1961 | Shuler | |
| 3,245,172 A | 4/1966 | Hawks | |
| 3,513,584 A * | 5/1970 | Donner | A01K 97/05 43/56 |
| 3,975,853 A | 8/1976 | Aaron | |
| 4,030,226 A * | 6/1977 | Shelton, Sr. | A01K 97/04 43/55 |
| 4,483,092 A | 11/1984 | Steiner | |
| 4,825,577 A * | 5/1989 | Brannon | A01K 97/04 D22/136 |
| 2015/0157002 A1 | 6/2015 | Paquette | |
| 2019/0281803 A1* | 9/2019 | Hopp | A01K 97/045 |

OTHER PUBLICATIONS amazon.com, Inc., Diyarea Automatic Commercial Vibrating Sifter Screen Shaker, https://www.amazon.com/DIYAREA-Automatic-Commercial-Shaker%EF%BC%8C110V-Industries/dp/B099PSPHBQ/ref=sr_1_18_sspa?crid=3FKC5ORXYHR3O&keywords=diyarea+automatic+commercial+vibrating+sifter+screen+shaker&qid=1693409848&sprefix=diyarea+automat%2Caps%2C532&sr=8-18-spons&sp_csd=d2lkZ2V0TmFtZT1zcF9tdGY&psc=1, Aug. 30, 2023, Amazon.com, Inc.

amazon.com, Inc., Mopalo 12 Soil Sieve Set, https://www.amazon.com/Mopalo-Soil-Sieve-Interchangeable-Screens/dp/B0946BX45M/ref=sr_1_2?crid=UTQ4H0L083WV&keywords=mopalo+12%22+soil+sieve+set&qid=1693410282&sprefix=mopalo+soil%2Caps%2C221&sr=8-2, Aug. 30, 2023, Amazon.com, Inc.

Amazon.com, Inc., Sand Sifter Sieves for Kids, https://www.amazon.com/Toddlers-Durable-Gardening-Treasure-Discovery/dp/B09N3J751G/ref=sr_1_5?crid=37X19VKOF31E1&keywords=sand+sifter+sieves+for+kids&qid=1693410431&sprefix=sand+sifter+sieves+for+kids%2Caps%2C185&sr=8-5, Aug. 30, 2023, Amazon.com, Inc.

* cited by examiner

*Primary Examiner* — Richard G Davis
(74) *Attorney, Agent, or Firm* — Fargo Patent & Business Law; Thomas Kading; Joshua Krank

(57) ABSTRACT

A fishing bait cartridge speed loader includes a body along an axis comprising an inlet and an outlet; a multiple of bait orientation feeder channels within the inlet to the body; and a bait cartridge receipt member adjacent to the outlet to receive a bait cartridge along the axis such that each of the multiple of bait orientation feeder channels are aligned with at least one of a multiple of bait cells within the bait cartridge.

19 Claims, 14 Drawing Sheets

FISHING BAIT CARTRIDGE SPEED LOADER

CROSS REFERENCE TO RELATED APPLICATION[S]

The present disclosure claims priority to U.S. Provisional Patent Application No. 63/374,025 filed Aug. 31, 2022 (01667-BAR).

BACKGROUND

The present disclosure relates to fishing and more specifically to a fishing bait cartridge speed loader and speed loading system.

Fishing bait such as with wax worms, grubs, earthworms, leeches, iron worms, minnows, insects generally, grasshoppers, crickets, synthetic bait, fake bait, and other bait types may be stored in cartridges that are used to bait a hook. The cartridges facilitate the baiting of a hook with gloved hands while ice fishing but may initially be somewhat difficult to fill.

SUMMARY

A fishing bait cartridge speed loader according to one disclosed non-limiting embodiment of the present disclosure includes a body along an axis comprising an inlet and an outlet; a multiple of bait orientation feeder channels within the inlet to the body; and a bait cartridge receipt member adjacent to the outlet to receive a bait cartridge along the axis such that each of the multiple of bait orientation feeder channels are aligned with at least one of a multiple of bait cells within the bait cartridge.

A further embodiment of any of the foregoing embodiments of the present disclosure includes that the inlet to the body is of a greater diameter than the outlet of the body.

A further embodiment of any of the foregoing embodiments of the present disclosure includes that the body is frusto-conical.

A further embodiment of any of the foregoing embodiments of the present disclosure includes that the multiple of bait orientation feeder channels are parallel to the axis.

A further embodiment of any of the foregoing embodiments of the present disclosure includes that the multiple of bait orientation feeder channels feed from an outer diameter toward an inner diameter of the body.

A further embodiment of any of the foregoing embodiments of the present disclosure includes an alignment tab on the bait cartridge receipt member to align the bait cartridge.

A further embodiment of any of the foregoing embodiments of the present disclosure includes an inner feeder stop member received within the inlet to the body.

A further embodiment of any of the foregoing embodiments of the present disclosure includes that the inner feeder stop member is movable along the axis.

A further embodiment of any of the foregoing embodiments of the present disclosure includes that the inner feeder stop member is movable along the axis to an open position in response to the bait cartridge being attached to the bait cartridge receipt member.

A further embodiment of any of the foregoing embodiments of the present disclosure includes that the open position permits a flow of bait through the multiple of bait orientation feeder channels an into the bait cartridge.

A further embodiment of any of the foregoing embodiments of the present disclosure includes that the inner feeder stop member is movable along the axis to a closed position in response to the bait cartridge being removed from the bait cartridge receipt member.

A further embodiment of any of the foregoing embodiments of the present disclosure includes that the closed position blocks a flow of bait through the multiple of bait orientation feeder channels.

A further embodiment of any of the foregoing embodiments of the present disclosure includes that the fishing bait cartridge speed loader is sized to nest with a cylindrical spacer.

A fishing bait cartridge loading system according to one disclosed non-limiting embodiment of the present disclosure includes a fishing bait cartridge speed loader; and a fishing bait cartridge attached to the fishing bait cartridge speed loader.

A further embodiment of any of the foregoing embodiments of the present disclosure includes a sifter assembly upstream of the fishing bait cartridge speed loader.

A further embodiment of any of the foregoing embodiments of the present disclosure includes a tank upstream of the fishing bait cartridge speed loader to communicate a fluid flow containing bait into the fishing bait cartridge via the fishing bait cartridge speed loader.

A further embodiment of any of the foregoing embodiments of the present disclosure includes a pump in communication with the tank to provide a motive force that communicates the fluid flow containing bait.

A further embodiment of any of the foregoing embodiments of the present disclosure includes a flow path in communication with the fishing bait cartridge speed loader and the tank to return the fluid from the fishing bait cartridge back to the tank.

A further embodiment of any of the foregoing embodiments of the present disclosure includes that the fluid flow containing bait communicates with a multiple of bait orientation feeder channels within the fishing bait cartridge speed loader.

A further embodiment of any of the foregoing embodiments of the present disclosure includes that the fluid flow containing bait communicates with one of a multiple of bait orientation feeder channels within the fishing bait cartridge speed loader.

A further embodiment of any of the foregoing embodiments of the present disclosure includes a decoy within the tank to frighten the bait toward the fishing bait cartridge speed loader.

A further embodiment of any of the foregoing embodiments of the present disclosure includes an attractor adjacent to the fishing bait cartridge to attract the bait toward the fishing bait cartridge speed loader.

A method for loading a fishing bait cartridge according to one disclosed non-limiting embodiment of the present disclosure includes communicate a fluid flow containing bait into a fishing bait cartridge via a fishing bait cartridge speed loader.

A further embodiment of any of the foregoing embodiments of the present disclosure includes communicating the fluid flow through a multiple of bait orientation feeder channels within the fishing bait cartridge speed loader.

A further embodiment of any of the foregoing embodiments of the present disclosure includes returning the fluid flow to a tank leaving the bait within the fishing bait cartridge.

A sifter assembly for bait according to one disclosed non-limiting embodiment of the present disclosure includes an upper cover; a filter section; a cylindrical spacer between the upper cover and the filter section; a lower cover; and a cylindrical spacer between the filter section and the lower cover.

A further embodiment of any of the foregoing embodiments of the present disclosure includes a multiple of anchors that extend from the filter section.

A further embodiment of any of the foregoing embodiments of the present disclosure includes a multiple of hooks that extend from the upper cover and the lower cover.

A further embodiment of any of the foregoing embodiments of the present disclosure includes a multiple of elastic bands that extend between each of the multiple of anchors and one of the hooks to axially retain the upper cover, the filter section, the cylindrical spacers, and the lower cover.

A further embodiment of any of the foregoing embodiments of the present disclosure includes that the cylindrical spacer is sized to nest with a fishing bait cartridge speed loader.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
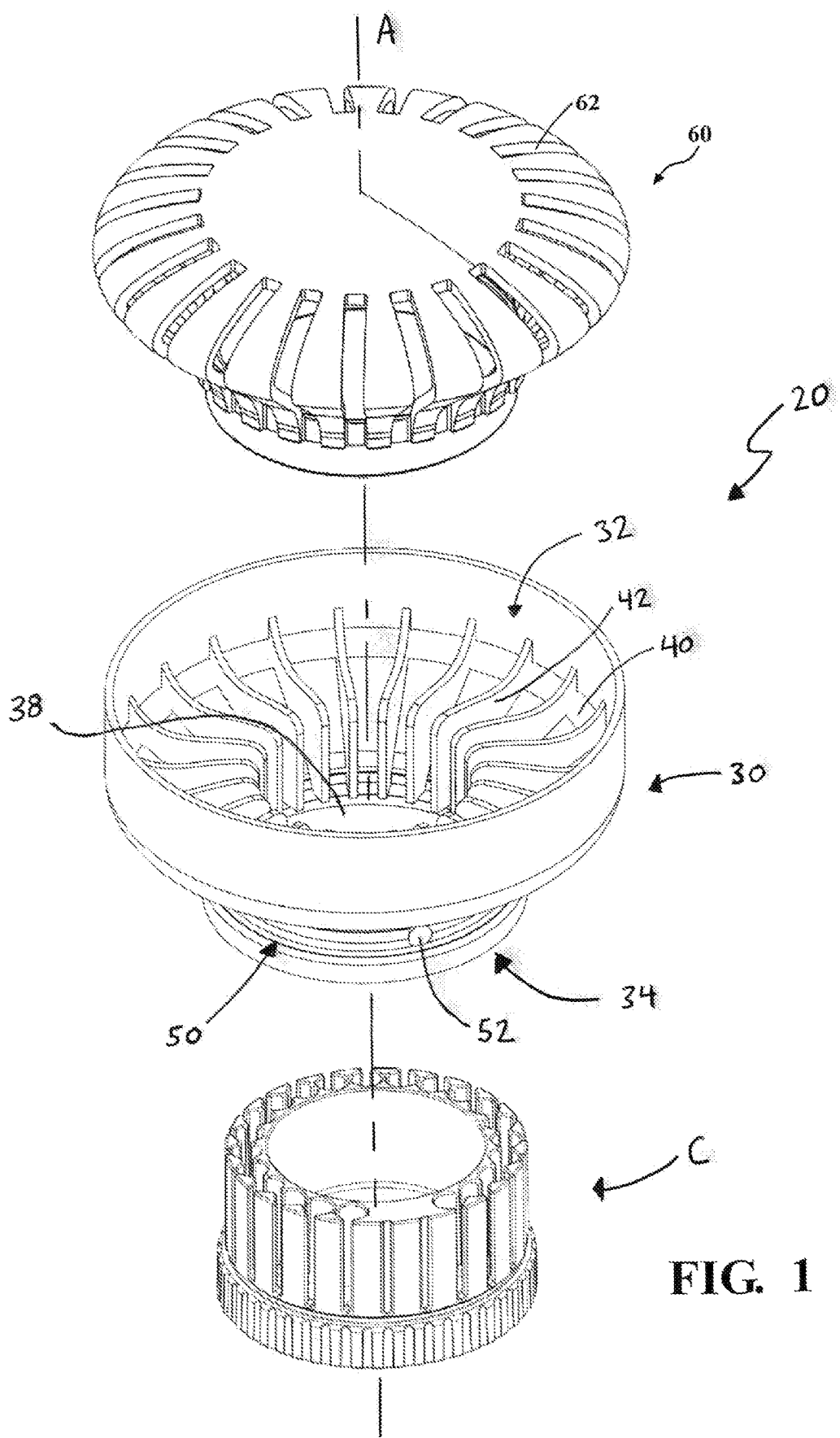
FIG. 1 is an exploded view of a fishing bait cartridge speed loader assembly according to one disclosed non-limiting embodiment.

FIG. 1 schematically illustrates a fishing bait cartridge speed loader 20 that readily loads a fishing bait cartridge C such as that disclosed in U.S. patent application Ser. No. 17/725,933 FISHING BAIT CARTRIDGE which is hereby incorporated by reference. The bait cartridge C stores bait in a multiple of individual cells which may thereafter be individually removed from each cell by insertion of a hook. The bait is thereby advantageously attached to the hook, while wearing gloves and without touching the bait. The bait cartridge C may be configured in size and shape to allow for the bait cartridge C to fit within a fisher's pocket and may be of size and shape appropriate for other types of baits or containers. Bait may be used for fishing, as well as feeding animals such as reptiles and amphibians.

Figure 2:
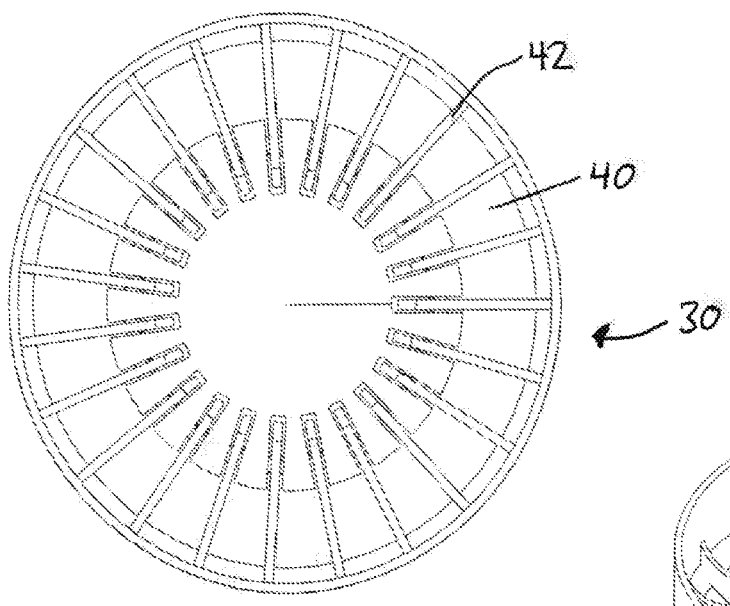
FIG. 2 is a top view of a body of the fishing bait cartridge speed loader of FIG. 1.
Figure 3:
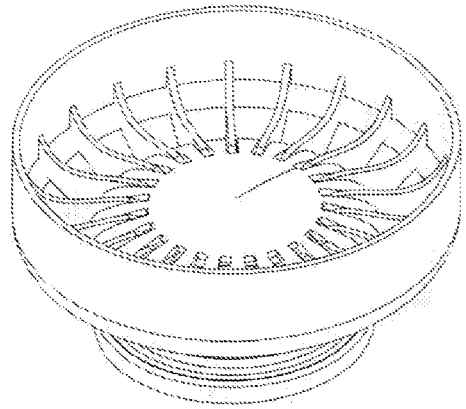
FIG. 3 is a side view of the body of the fishing bait cartridge speed loader of FIG. 1.
Figure 3:
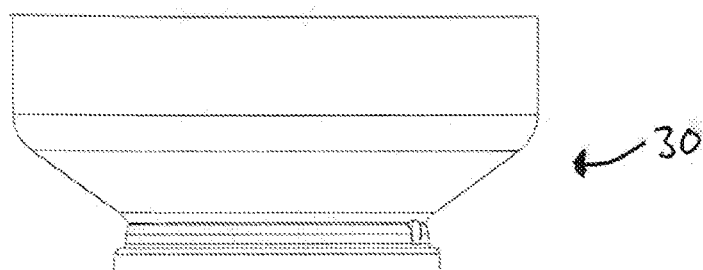
Figure 5:
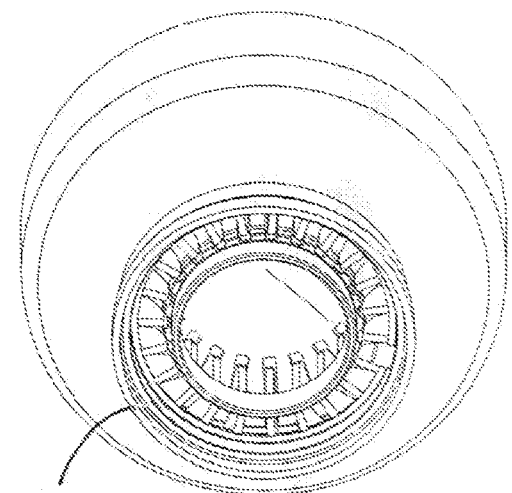
FIG. 5 is a bottom perspective view of the body of the fishing bait cartridge speed loader of FIG. 1.
Figure 4:
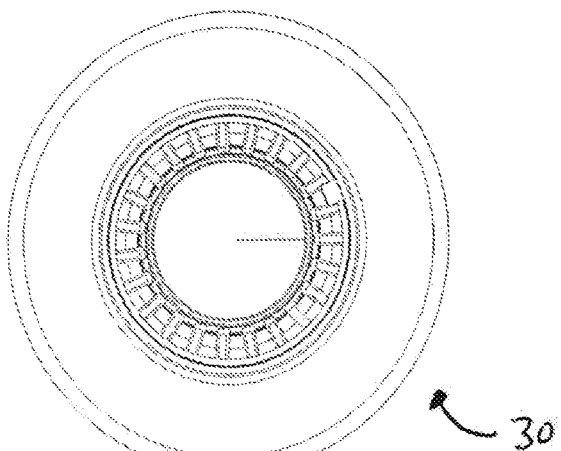
FIG. 4 is a bottom view of the body of the fishing bait cartridge speed loader of FIG. 1.
Figure 6:
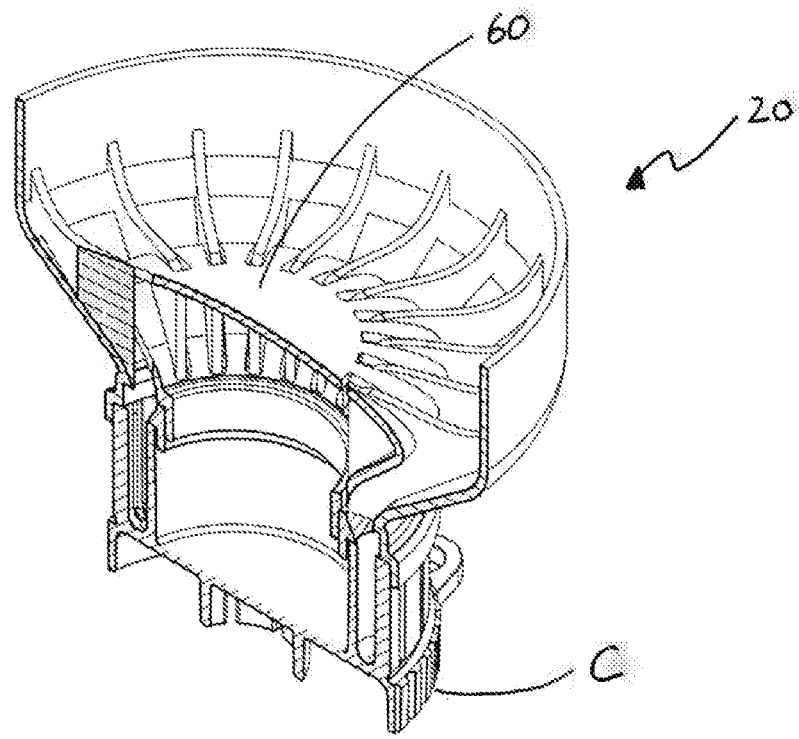
FIG. 6 is a partial perspective sectional view of the fishing bait cartridge speed loader assembly of FIG. 1.
Figure 7:
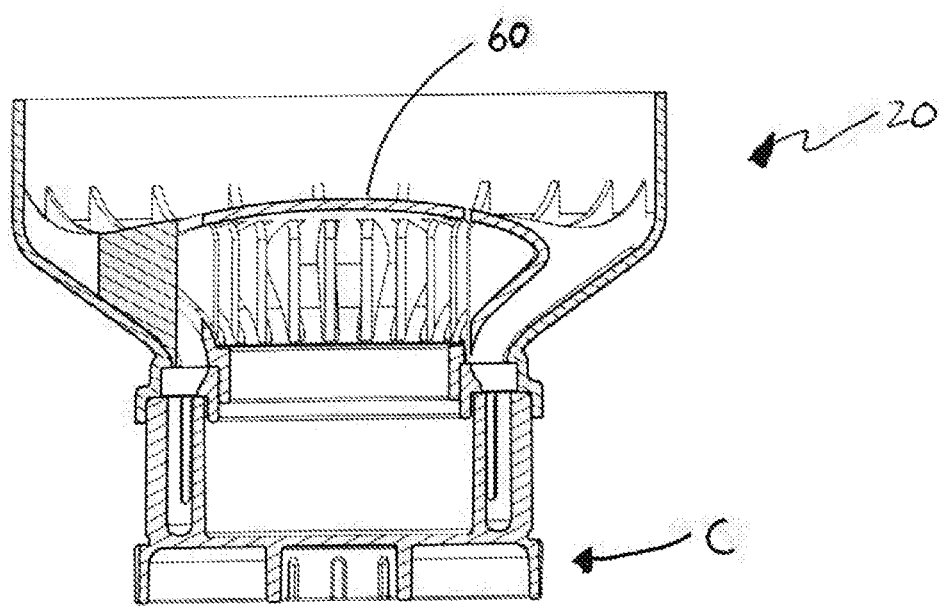
FIG. 7 is a sectional view of the fishing bait cartridge speed loader assembly of FIG. 1.

The fishing bait cartridge speed loader 20 generally includes a body 30 (also shown in FIG. 2-5) with an inlet 32 (also shown in FIG. 2) and an outlet 34 (also shown in FIG. 4-5) along an axis A, a multiple of bait orientation feeder channels 40 within the inlet 32 and a bait cartridge receipt member 50 adjacent to the outlet 34 to receive the bait cartridge C along the axis A such that each of the multiple of bait orientation feeder channels 40 are aligned with one of the bait cells within the bait cartridge C (also shown in FIGS. 6 and 7). In one disclosed illustrated embodiment, the body 30 may be frusto-conical. The inlet 32 to the body 30 may be of larger diameter than the outlet 34 to facilitate a funnel like action (also shown in FIG. 3) to communicate the bait B therethrough. The multiple of bait orientation feeder channels 40 are parallel to the axis A and may include a multiple of partitions 42 that follow the inner contour of the fishing bait cartridge speed loader 20. That is, the multiple of partitions 42 provide individual paths to funnel the bait directly into each of the multiple of individual cells of the bait cartridge B.

An alignment tab 52 on the bait cartridge receipt member 50 of the body 30 rotationally aligns the bait cartridge C to the multiple of bait orientation feeder channels 40 such that the bait B may be communicated directly into each of the multiple of individual cells of the bait cartridge C. The bait cartridge receipt member 50 of the body 30 may allow the bait cartridge C to be snapped or otherwise friction fit to the fishing bait cartridge speed loader 20.

In one embodiment, an inner feeder stop member 60 is received within the inlet 32 to the body 30. The inner feeder stop member 60 may be plug shaped with a multiple of slots 62 that correspond and receive each of the multiple of partitions 42 to block a central aperture 38 of the body 30.

That is, the inner feeder stop member 60 selectively operates as a flow plug for the body 30.

Figure 8:
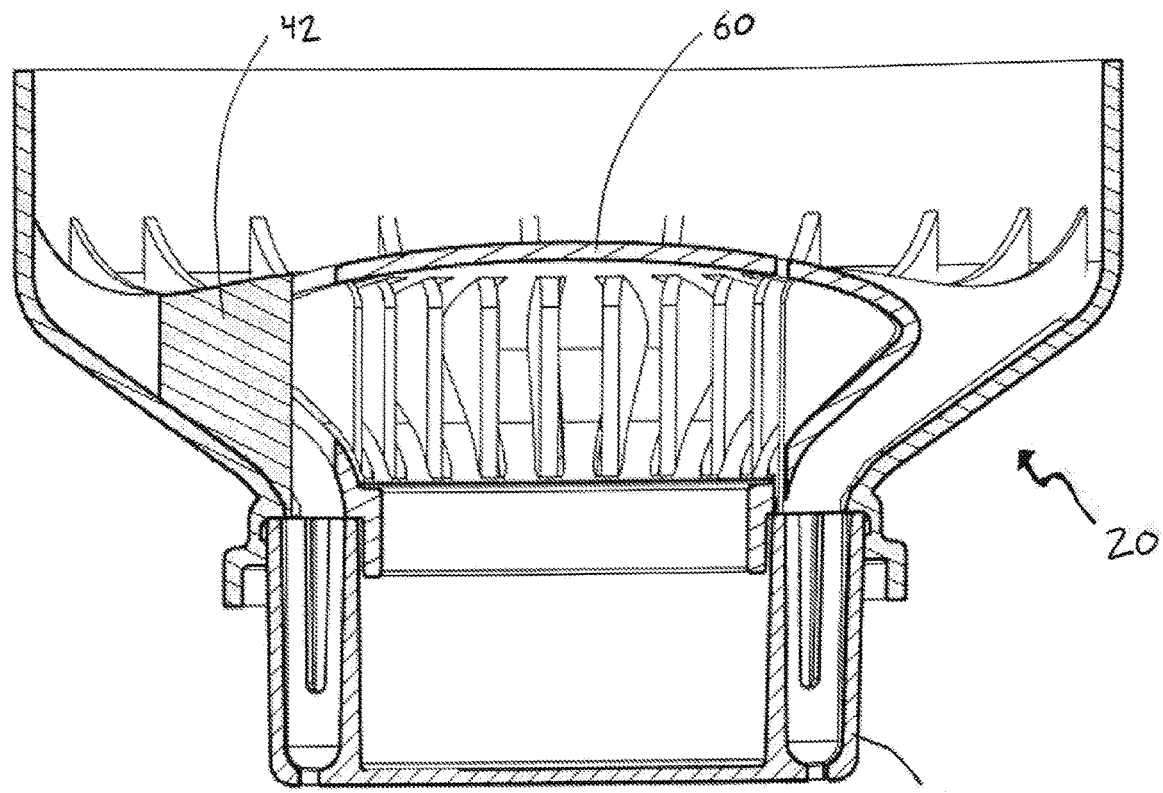
FIG. 8 is a sectional view of the fishing bait cartridge speed loader assembly of FIG. 1 in an open position.
Figure 9:
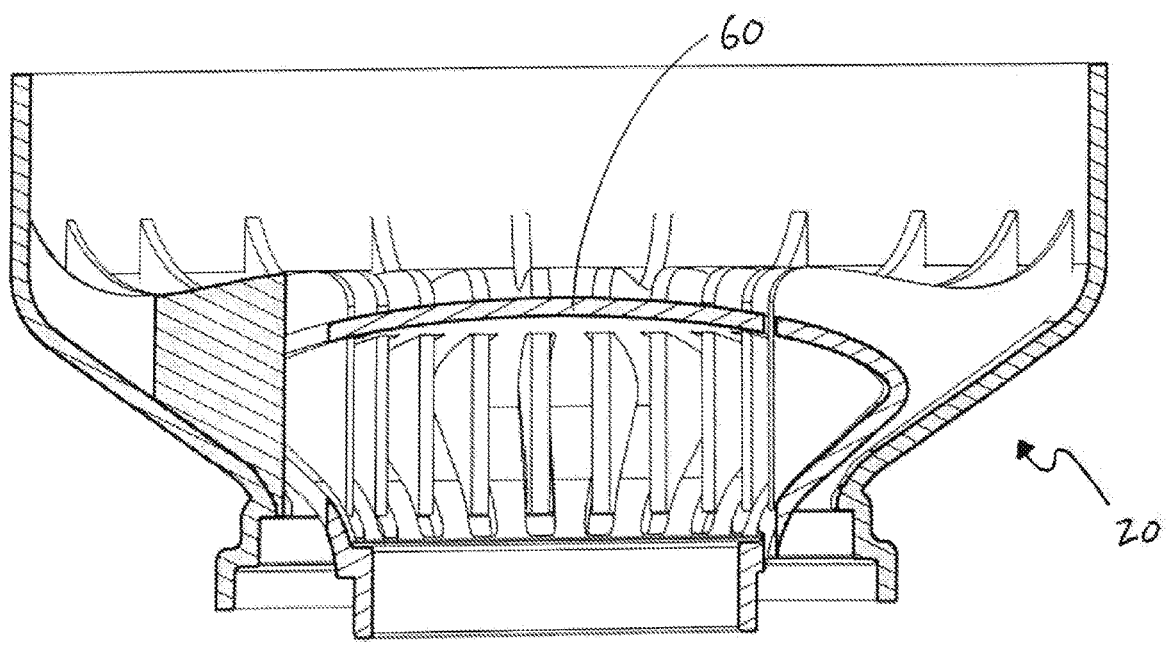
FIG. 9 is a sectional view of the fishing bait cartridge speed loader assembly of FIG. 1 in a closed position.
Figure 11:
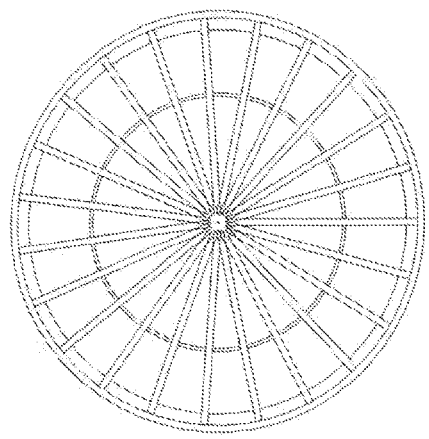
FIG. 10-14 are views of a body of the fishing bait cartridge speed loader according to one disclosed non-limiting embodiment.
Figure 10:
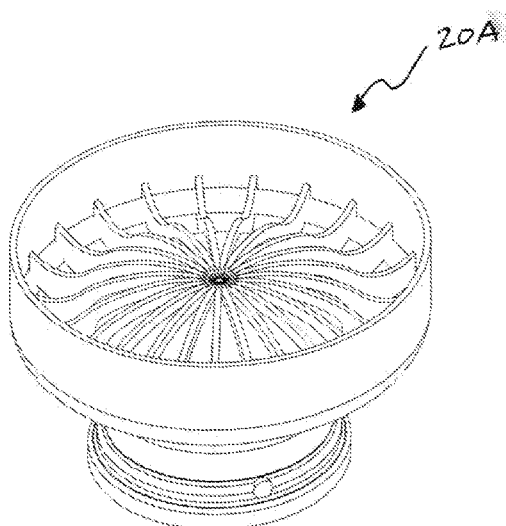
Figure 12:
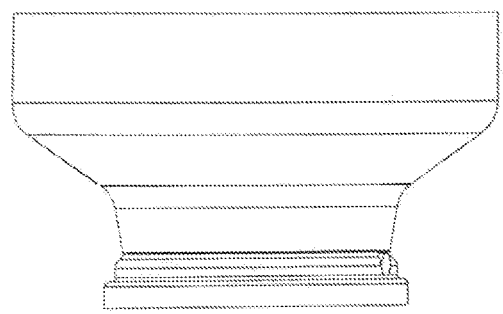
Figure 13:
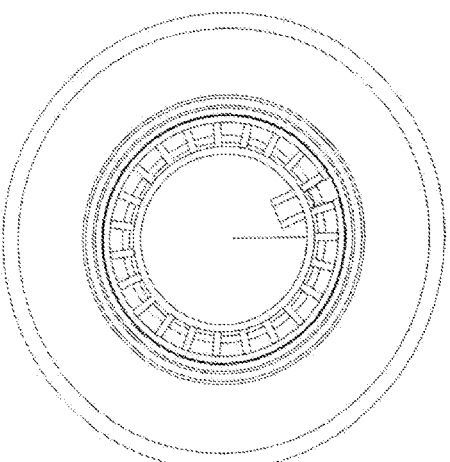
Figure 14:
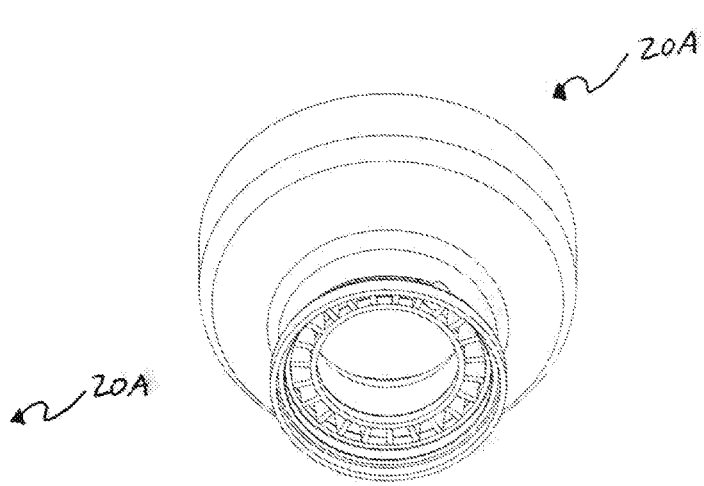
Figure 16:
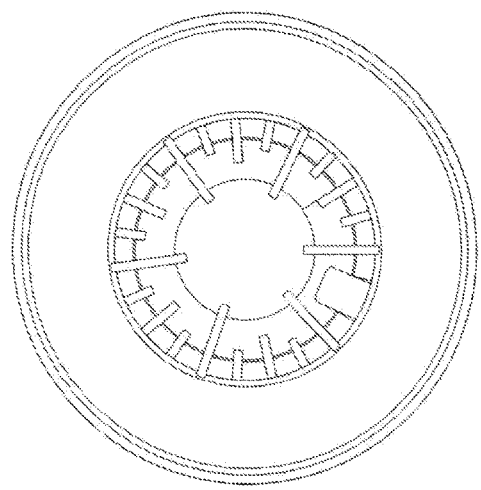
FIG. 15-19 are views of a body of the fishing bait cartridge speed loader according to one disclosed non-limiting embodiment.
Figure 15:
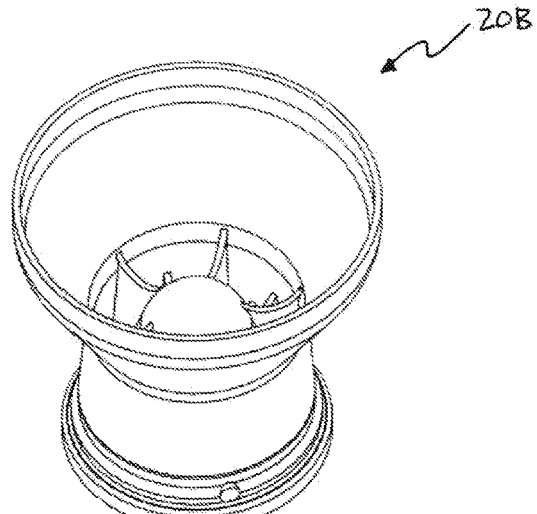
Figure 17:
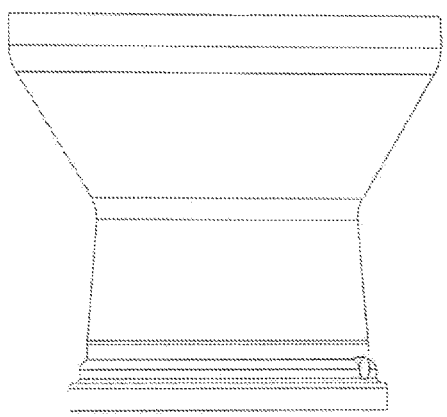
Figure 18:
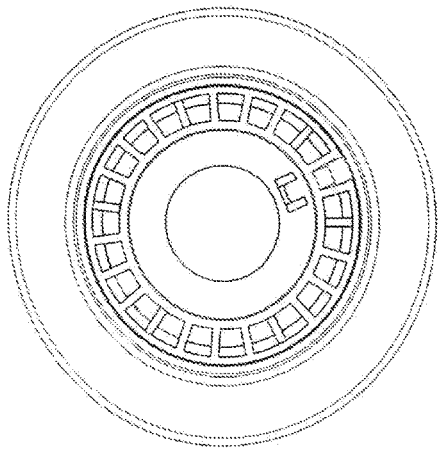
Figure 19:
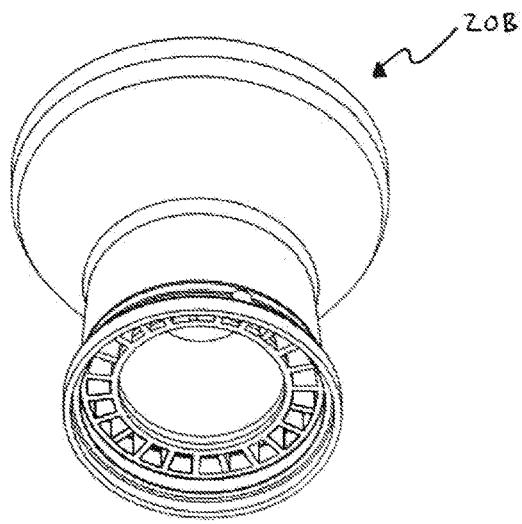

The inner feeder stop member 60 is movable along the axis A between an open position (FIG. 8) and a closed position (FIG. 9). The inner feeder stop member 60 is moved to the open position in response to the bait cartridge C being attached to the bait cartridge receipt member 50 and is moved to the closed position (FIG. 9) in response to removal thereof. The closed position blocks a fluid flow that contains bait through the multiple of bait orientation feeder channels. This permits the sequential attachment of a multiple of bait cartridges B when configured as part of a fishing bait cartridge loading system 100 as will be further described.

With reference to FIG. 10-14, in another embodiment, a fishing bait cartridge speed loader 20A provides an outside-in fluid flow direction without the inner feeder stop member 60. That is, the central portion of the fishing bait cartridge speed loader 20A is closed and the flow of bait B is generally from the outer diameter inward.

With reference to FIG. 15-19, in another embodiment, a fishing bait cartridge speed loader 20B provides a top down flow which may be advantageous for loading bait individually by hand, or for speed loading a bait cartridge. That is, the fishing bait cartridge speed loader 20B operates to permit a user to manually load each cell individually by hand through the fishing bait cartridge speed loader 20B or to speed load them such that alignment occurs substantially simultaneously. This configuration may include a smaller rigid center section that is rigidly attached to the outer walls.

Figure 20:
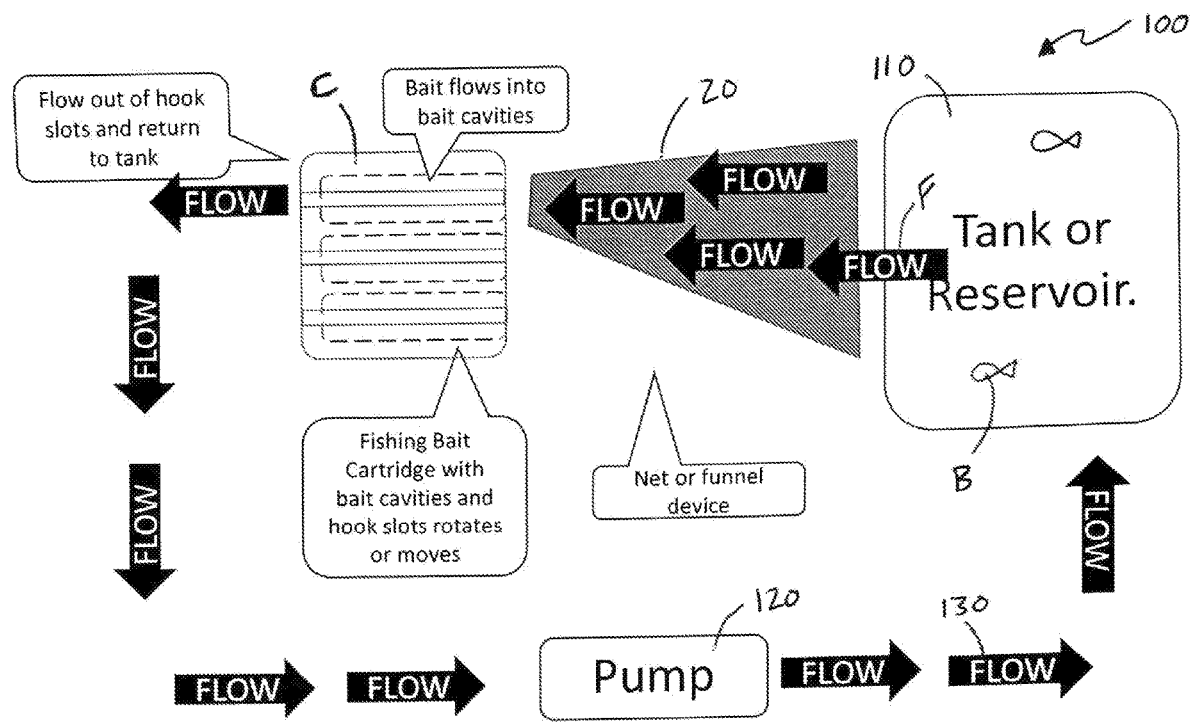
FIG. 20 is a schematic view of a fishing bait cartridge loading system according to one disclosed non-limiting embodiment.
Figure 21:
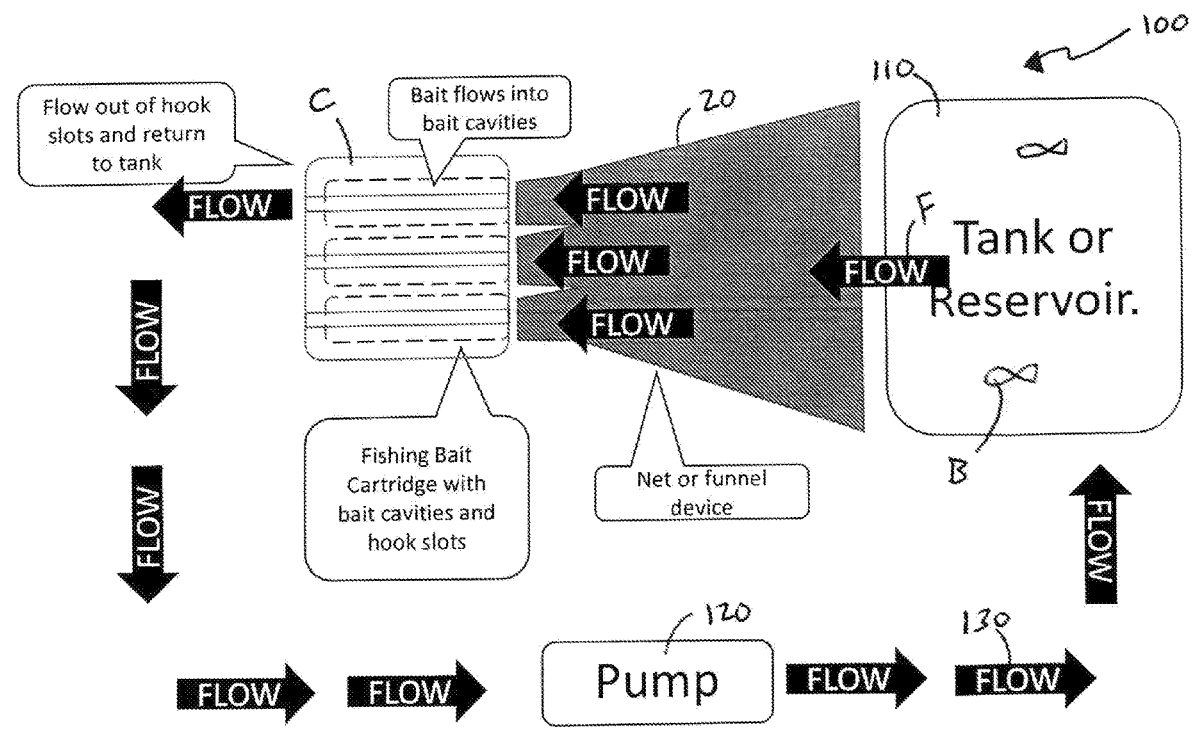
FIG. 21 is a schematic view of a fishing bait cartridge loading system according to another disclosed non-limiting embodiment.
Figure 22:
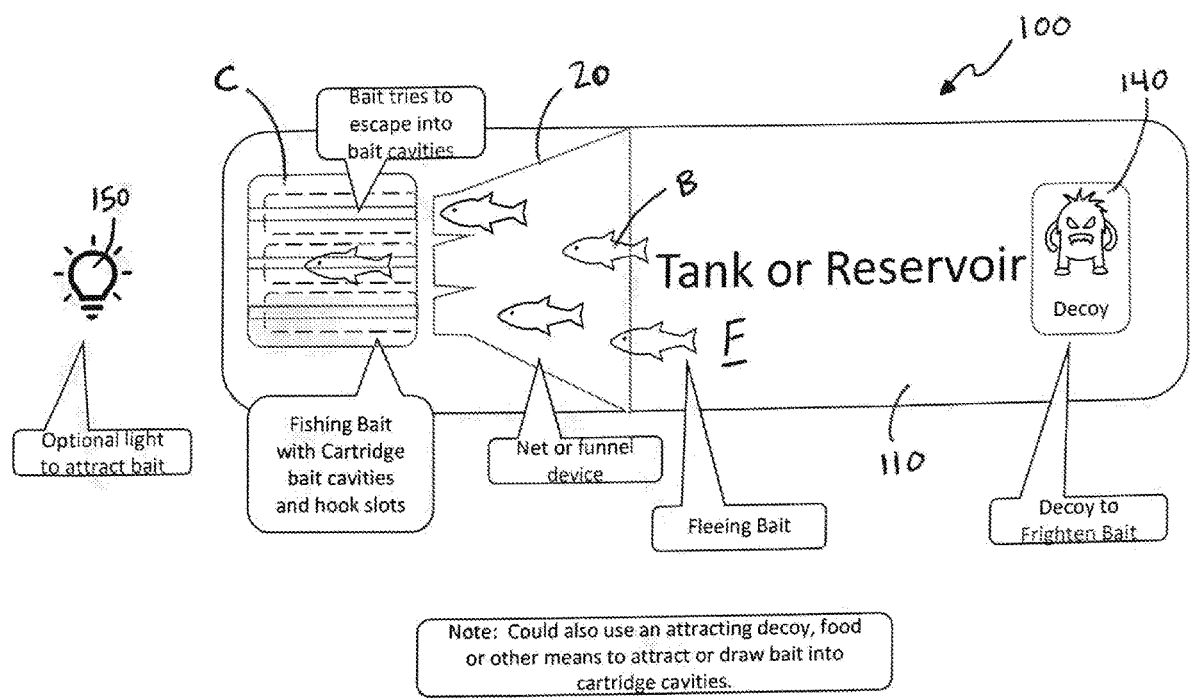
FIG. 22 is a schematic view of a fishing bait cartridge loading system according to another disclosed non-limiting embodiment.

With reference to FIG. 20-22, the fishing bait cartridge loading system 100 generally includes the fishing bait cartridge C attached to the fishing bait cartridge speed loader 20 and a tank 110 upstream of the fishing bait cartridge speed loader 20 to communicate a fluid flow F containing bait B into the fishing bait cartridge C via the fishing bait cartridge speed loader 20. To facilitate the communication of the fluid flow F containing the bait B from the tank, a pump 120 in communication with the tank 110 may be used to provide a motive force that communicates the fluid flow containing bait B.

A flow path 130 in communication with the fishing bait cartridge C and/or the fishing bait cartridge speed loader 20 may be used to return the fluid from the fishing bait cartridge B back to the tank 110. The fishing bait cartridge loading system 100 provides a closed loop fluid flow with regard to the tank 110. The fluid flow may be directed by the fishing bait cartridge speed loader 20 into each of the multiple of bait orientation feeder channels 40 either individually (FIG. 20) or in parallel (FIG. 21). That is, the fluid flow containing bait B is communicated into the fishing bait cartridge C via the fishing bait cartridge speed loader 20 then is thereafter returned to the tank 110 leaving the bait B within the fishing bait cartridge C.

With reference to FIG. 22, in other embodiments, either with or without a pump, a decoy 140 within the tank 110 may be used to frighten the bait toward the fishing bait cartridge speed loader and/or an attractor 150 downstream of the fishing bait cartridge C may be used to attract the bait B through the fishing bait cartridge speed loader. The decoy 140 may be a predator representation or other device to direct the bait B. The attractor 150 may be a light, food, etc. to direct the bait B in the desired direction.

Figure 23:
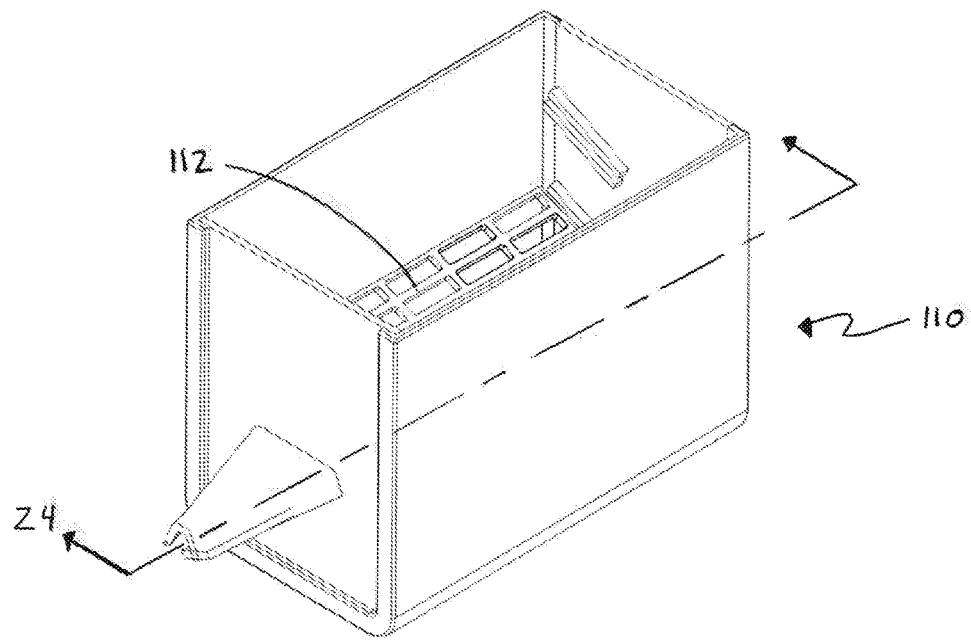
FIG. 23 is a perspective view of a tank for the fishing bait cartridge loading system.
Figure 24:
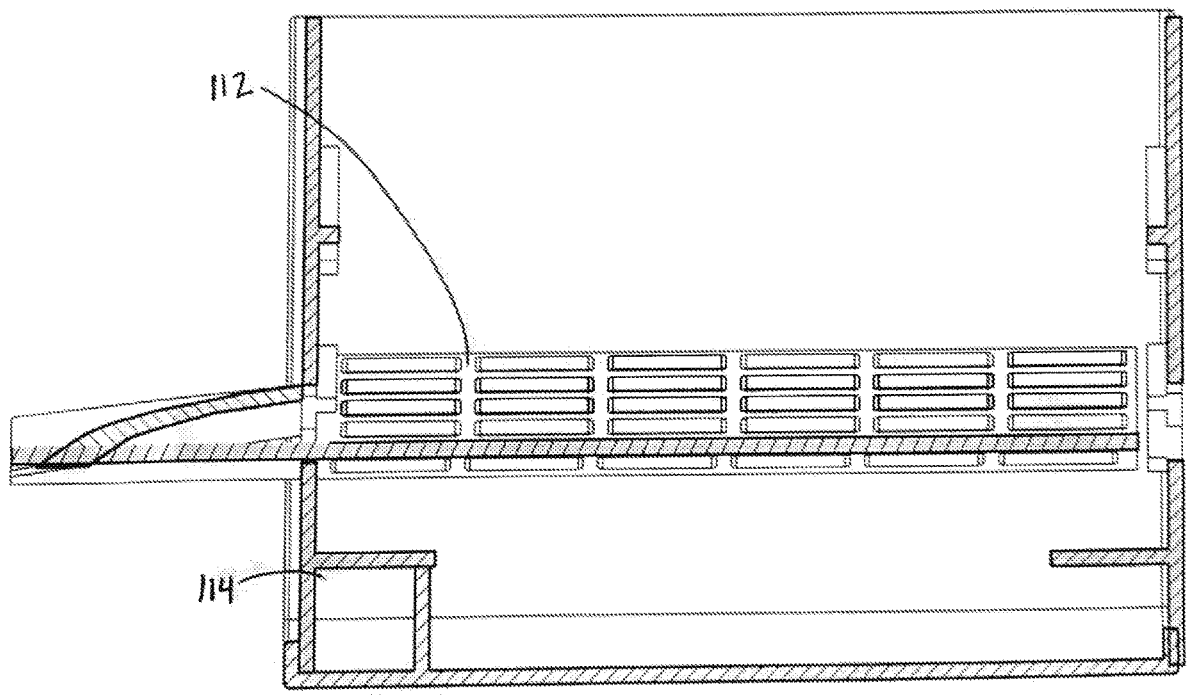
FIG. 24 is a sectional view of the tank taken along line 24 in FIG. 23.
Figure 25:
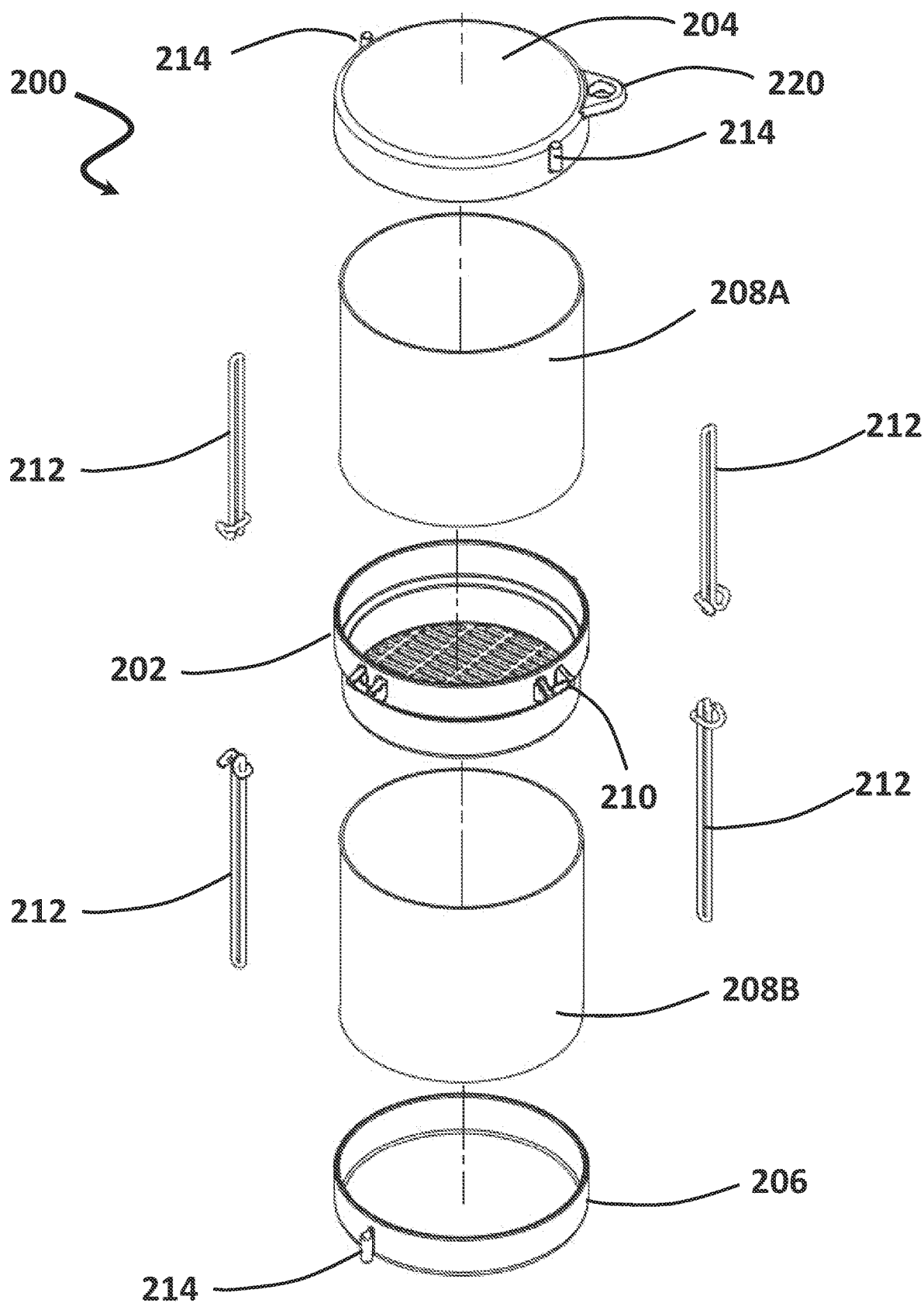
FIG. 25 is an exploded view of a bait sifter assembly according to one disclosed non-limiting embodiment.
Figure 26:
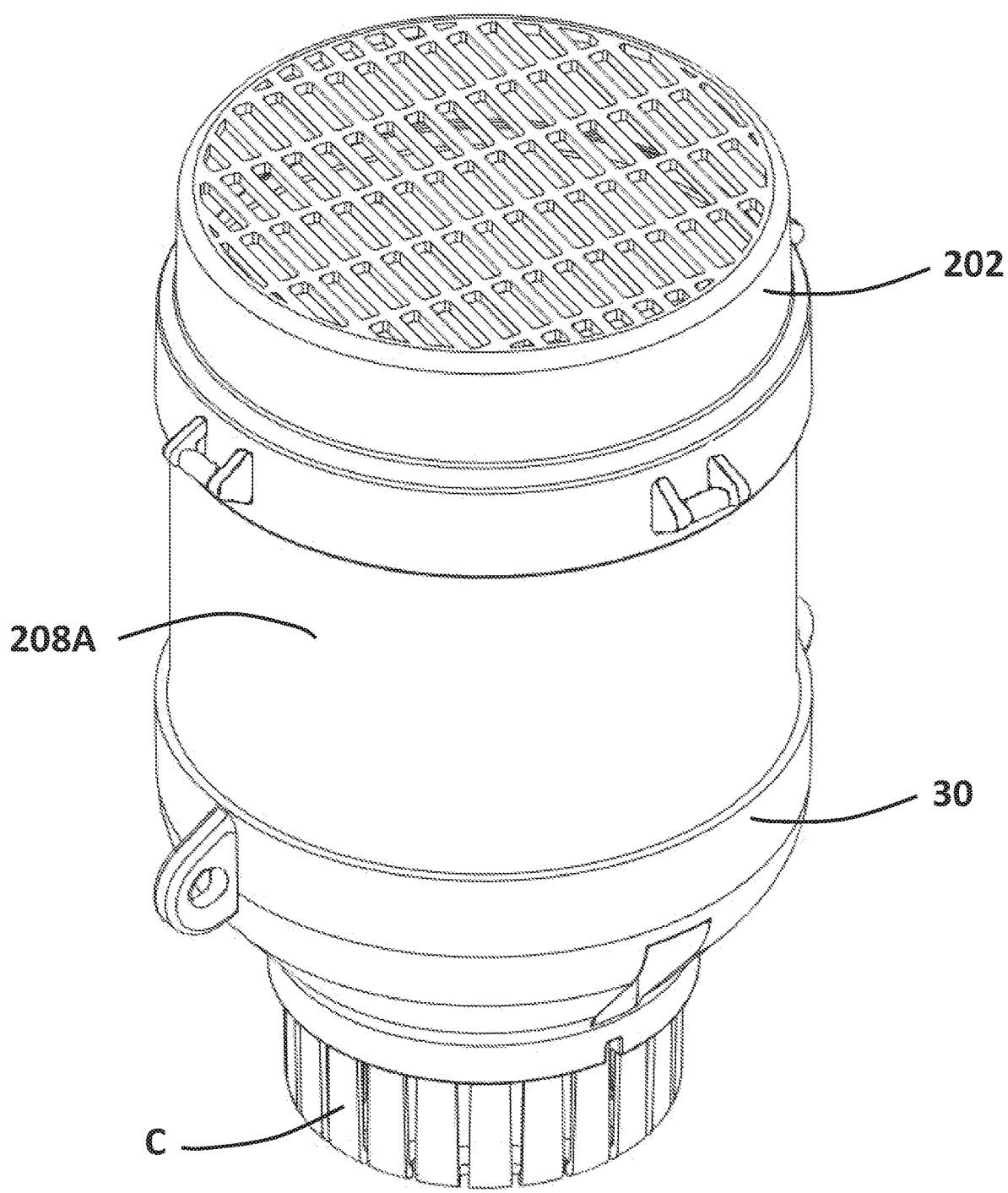
FIG. 26 is an assembled view of the bait sifter assembly attached to a fishing bait cartridge speed loader assembly.

With reference to FIG. 23-24, in other embodiments, the tank 110 may include a multiple of screens 112 to provide initial sorting of bait B. The tank 110 may also include a compartment 114 for a moving mass or other vibration system to facilitate movement of the bait through the screens 112. One or more screen mounts may be utilized to specify the bait size that is passable therethrough.

With reference to FIG. 25-29, in other embodiments, a sifter assembly 200 may be assembled to the fishing bait cartridge speed loader 20 (FIG. 26) to transfer the sifted bait to the bait cartridge C. The sifter assembly 200 generally includes a filter section 202 that may be enclosed by an upper cover 204, a lower cover 206, and a cylindrical spacer 208A, 208B. One or more of the filter section 202, upper cover 204, and the lower cover 206 may include an attachment ring 220 for retention, attaching to a lanyard, hanging on hook, etc.

Figure 27:
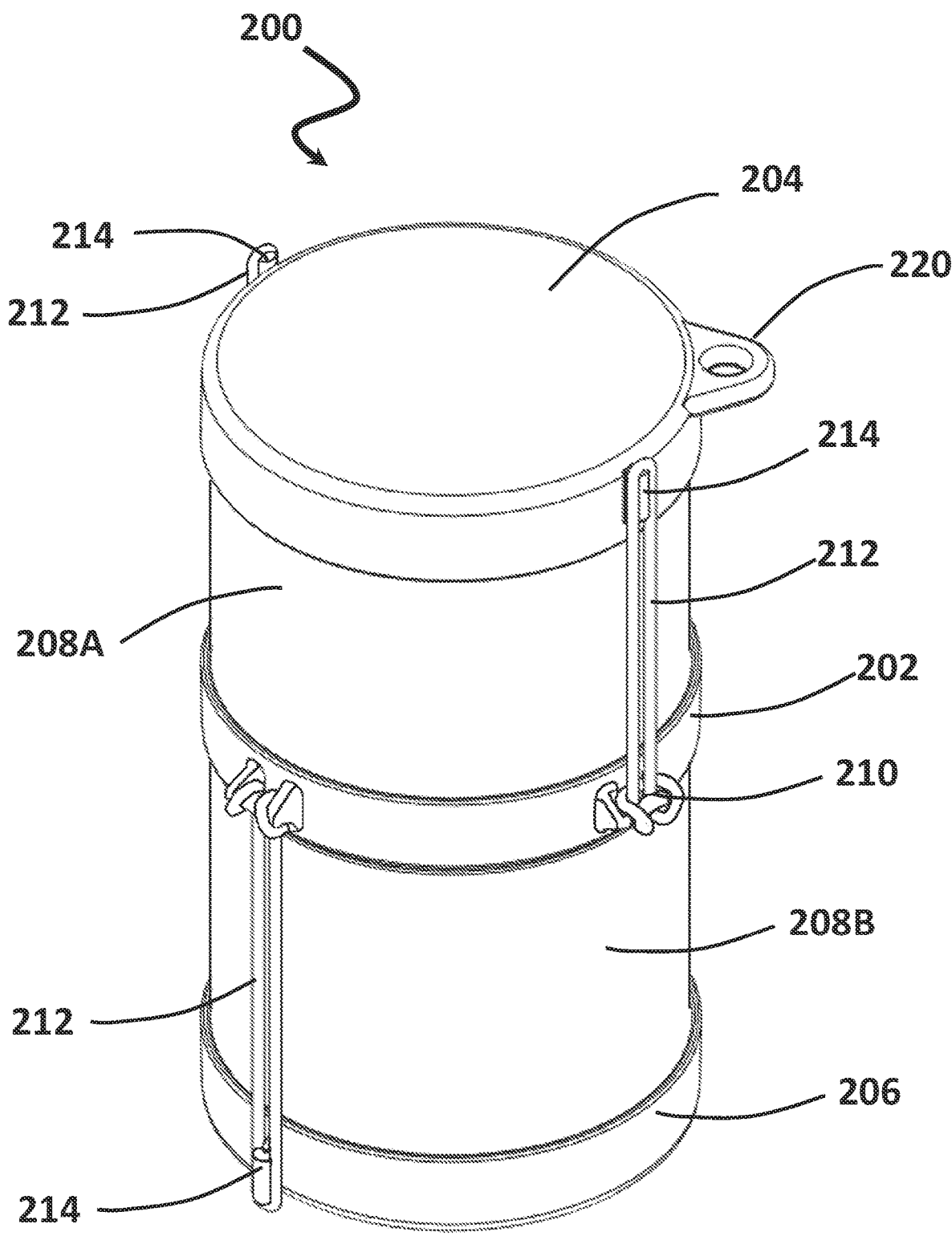
FIG. 27 is an assembled view of the bait sifter assembly.
Figure 28:
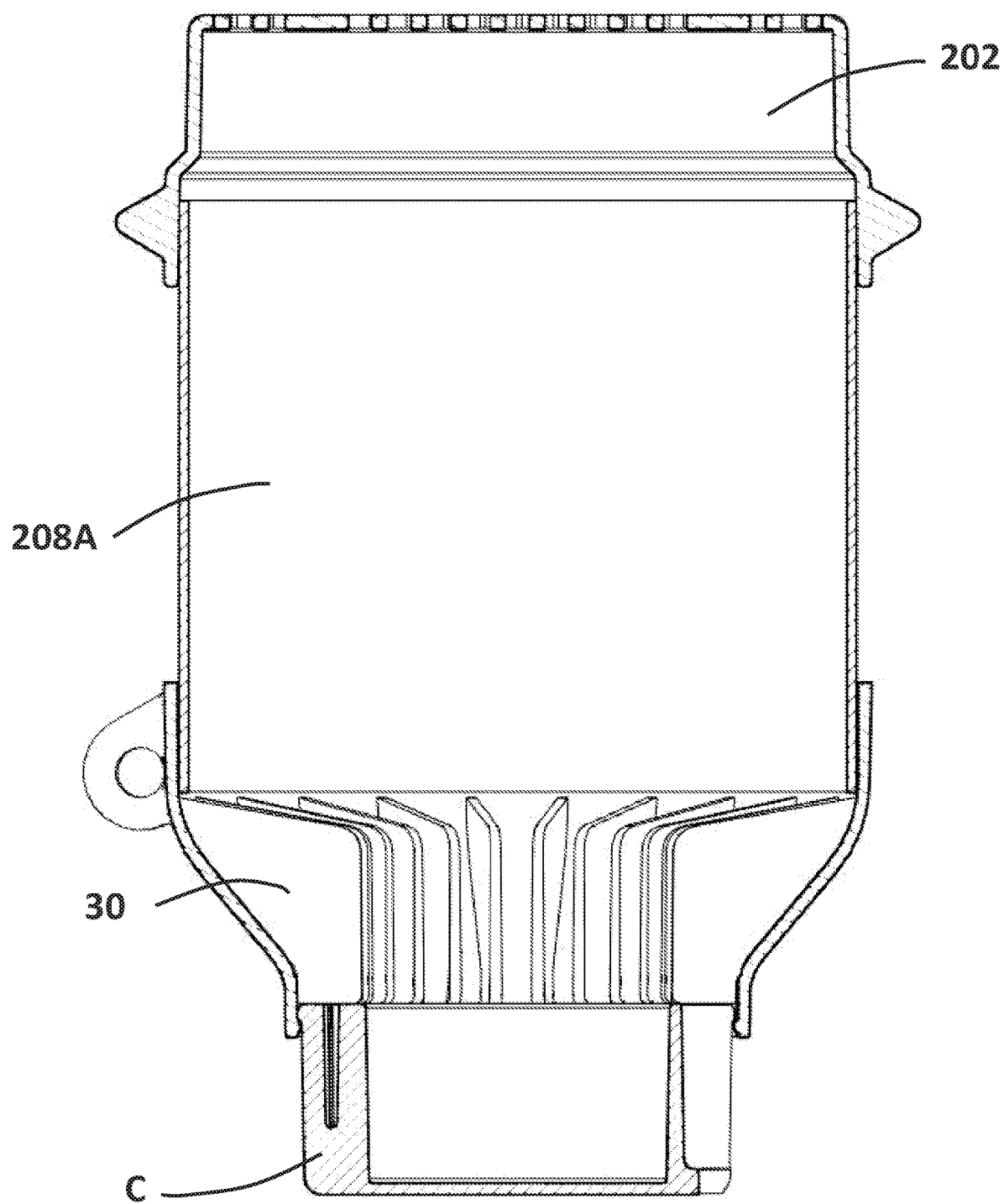
FIG. 28 is a sectional view of the bait sifter assembly.

The filter section 202 may include a multiple of anchors 210 (four shown) to which each are attached elastic bands 212. The elastic bands 212 engage corresponding hooks 214 on the upper cover 204 and the lower cover 206 to axially secure the components of the sifter assembly 200 (FIG. 27). The body 30 may also include the hooks 214 to facilitate assembly of the sifter assembly 200 to the fishing bait cartridge speed loader 20. Alternatively, the components may include threads to screw the assembly together. In addition, the components may include a sealing feature between the cylindrical spacers 208A and 208B, and the covers 204 and 206, and the filter section 202.

In use, the upper cover 204 is removed and the bait and bedding material is dumped atop the filter section 202. The upper cover 204 is then replaced and the sifter assembly 200 is shaken such that the bait remains atop the filter section 202 to separate the bait quickly and easily (e.g., waxworms or spikes etc.) from the sawdust bedding material. Alternatively, the sifter assembly 200 may be assembled to the fishing bait cartridge speed loader 20 prior to shaking. In one embodiment, the screen of the filter section 202 is optimized for waxworms and may also work with spikes or Euro Larva, etc. It should be appreciated, that alterative or additional screens may be used in the filter section 202, and they can be stacked with additional cylindrical spacers 208A or 208B between filter sections for sifting with multiple screens at the same time. The cylindrical spacers 208A, 208B may be constructed of a transparent material.

Figure 29:
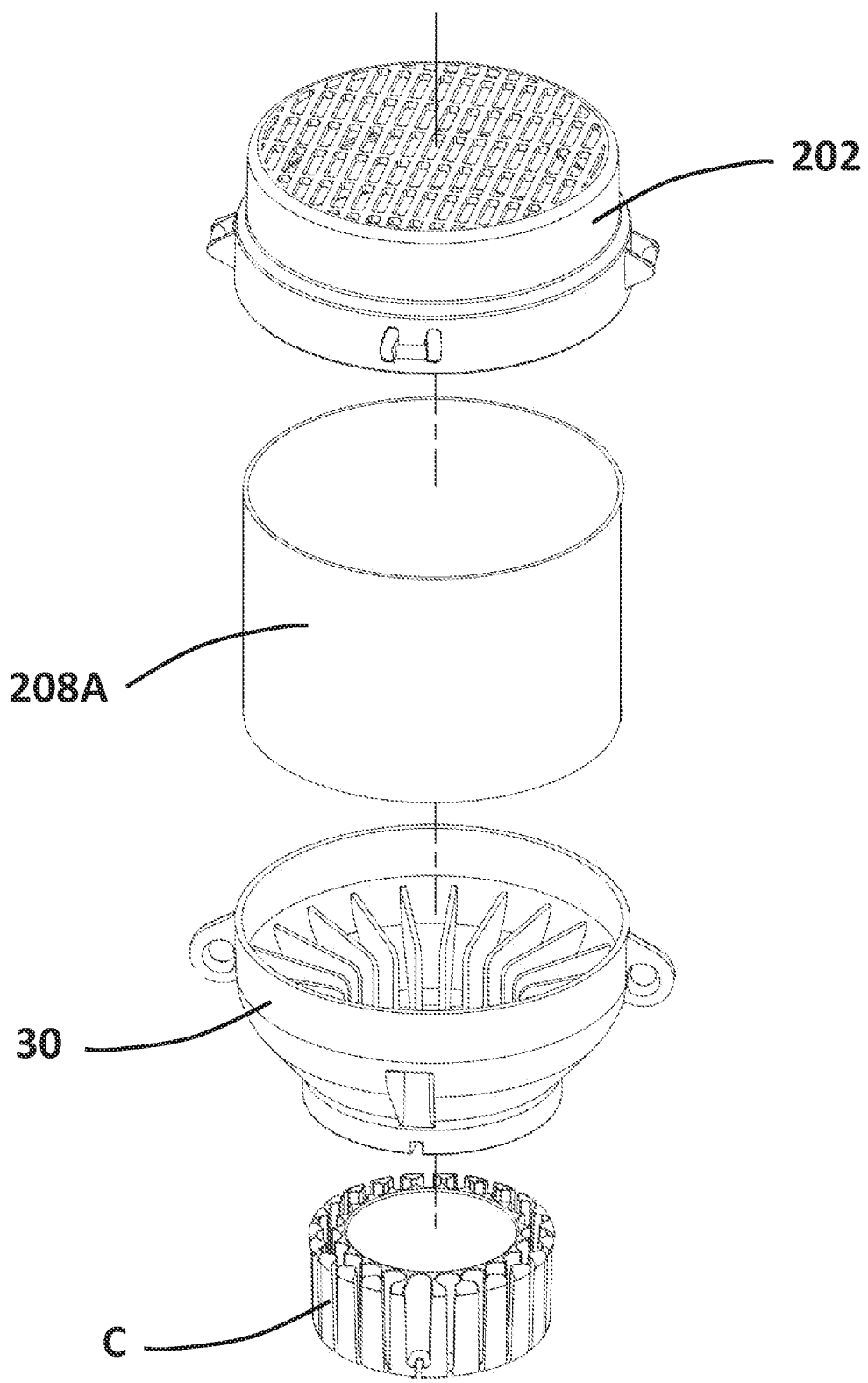
FIG. 29 is an exploded view of the bait sifter assembly for attachment to the fishing bait cartridge speed loader assembly.

The lower cover 206 is then removed together with the cylindrical spacer 208B and the fishing bait cartridge speed loader 20 with the attached bait cartridge C is attached to transfer bait through the fishing bait cartridge speed loader 20 into the attached bait cartridge C (FIG. 29). The fishing bait cartridge speed loader 20 may be nested with the cylindrical spacer 208A. That is, the cylindrical spacer 208A may friction fit with the fishing bait cartridge speed loader 20. Alternatively, the bait can be poured directly into the fishing bait cartridge speed loader 20 for communication into the attached bait cartridge C.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A fishing bait cartridge speed loader, comprising:
a body along an axis comprising an inlet and an outlet;
a multiple of bait orientation feeder channels within the inlet to the body; and
a bait cartridge receipt member adjacent to the outlet to receive a bait cartridge along the axis such that each of the multiple of bait orientation feeder channels are aligned with at least one of a multiple of bait cells within the bait cartridge.

2. The fishing bait cartridge speed loader as recited in claim 1, wherein the inlet to the body is of a greater diameter than the outlet of the body.

3. The fishing bait cartridge speed loader as recited in claim 2, wherein the body is frusto-conical.

4. The fishing bait cartridge speed loader as recited in claim 1, wherein the multiple of bait orientation feeder channels are parallel to the axis.

5. The fishing bait cartridge speed loader as recited in claim 1, wherein the multiple of bait orientation feeder channels feed from an outer diameter toward an inner diameter of the body.

6. The fishing bait cartridge speed loader as recited in claim 1, further comprising an alignment tab on the bait cartridge receipt member to align the bait cartridge.

7. The fishing bait cartridge speed loader as recited in claim 1, further comprising an inner feeder stop member received within the inlet to the body.

8. The fishing bait cartridge speed loader as recited in claim 7, wherein the inner feeder stop member is movable along the axis.

9. The fishing bait cartridge speed loader as recited in claim 8, wherein the inner feeder stop member is movable along the axis to an open position in response to the bait cartridge being attached to the bait cartridge receipt member.

10. The fishing bait cartridge speed loader as recited in claim 9, wherein the open position permits a flow of bait through the multiple of bait orientation feeder channels an into the bait cartridge.

11. The fishing bait cartridge speed loader as recited in claim 8, wherein the inner feeder stop member is movable along the axis to a closed position in response to the bait cartridge being removed from the bait cartridge receipt member.

12. The fishing bait cartridge speed loader as recited in claim 11, wherein the closed position blocks a flow of bait through the multiple of bait orientation feeder channels.

13. The fishing bait cartridge speed loader as recited in claim 1, wherein the fishing bait cartridge speed loader is sized to nest with a cylindrical spacer.

14. The fishing bait cartridge speed loader as recited in claim 13, wherein the cylindrical spacer is a portion of a sifter assembly for bait.

15. The fishing bait cartridge speed loader as recited in claim 14, wherein the sifter assembly comprises:
an upper cover;
a filter section; and
the cylindrical spacer between the upper cover and the filter section.

16. The fishing bait cartridge speed loader as recited in claim 15, wherein the sifter assembly comprises:
a lower cover; and
the cylindrical spacer between the filter section and the lower cover.

17. The fishing bait cartridge speed loader as recited in claim 16, further comprising a multiple of anchors that extend from the filter section.

18. The fishing bait cartridge speed loader as recited in claim 16, further comprising a multiple of hooks that extend from the upper cover and the lower cover.

19. The fishing bait cartridge speed loader as recited in claim 1, wherein fluid is used as a media to induce flow through the channels.

* * * * *